US012792402B2

(12) United States Patent
Sarkar et al.

(10) Patent No.: US 12,792,402 B2
(45) Date of Patent: Nov. 10, 2026

(54) CONVERSATION RESOURCE DEALLOCATION SYSTEM

(71) Applicant: SAP SE, Walldorf (DE)

(72) Inventors: Saurav Sarkar, Bangalore (IN); Sumeet Kumar, Bangalore (IN); Rahul K, Bangalore (IN)

(73) Assignee: SAP SE, Walldorf (DE)

( * ) Notice: Subject to any disclaimer, the term of this patent is extended or adjusted under 35 U.S.C. 154(b) by 320 days.

(21) Appl. No.: 18/511,429

(22) Filed: Nov. 16, 2023

(65) Prior Publication Data

US 2025/0165290 A1 May 22, 2025

(51) Int. Cl.
*G06F 9/50* (2006.01)
*H04L 51/02* (2022.01)

(52) U.S. Cl.
CPC ............ *G06F 9/5022* (2013.01); *H04L 51/02* (2013.01)

(58) Field of Classification Search
None
See application file for complete search history.

(56) References Cited

U.S. PATENT DOCUMENTS

| | | | | |
|---|---|---|---|---|
| 6,366,989 | B1 * | 4/2002 | Keskar | G06F 13/1694 365/189.16 |
| 10,348,658 | B2 * | 7/2019 | Rodriguez | H04L 65/1093 |
| 10,491,673 | B2 * | 11/2019 | Bhakar | H04L 67/1095 |
| 11,513,822 | B1 * | 11/2022 | Kwatra | G06F 3/04847 |
| 11,902,232 | B1 * | 2/2024 | van Doorn | G06F 3/0482 |
| 12,282,457 | B2 * | 4/2025 | Williams | G06F 16/122 |
| 2003/0105933 | A1 * | 6/2003 | Keskar | G06F 13/1694 711/167 |

(Continued)

FOREIGN PATENT DOCUMENTS

| | | | | |
|---|---|---|---|---|
| CN | 121051202 A | * | 12/2025 | G06F 40/284 |
| WO | WO-2010078614 A1 | * | 7/2010 | G06N 3/004 |
| WO | WO-2017019705 A1 | * | 2/2017 | G06F 40/284 |

OTHER PUBLICATIONS

Genesys Engage. "Workspace Desktop Edition. Chat Interaction." (Aug. 25, 2021). Retrieved online Feb. 27, 2026. (Year: 2021) https://www.google.com/url?sa=t&rct=j&q=&esrc=s&source=web&cd=&cad=rja&uact=8&ved=2ahUKEwjgicTnofqSAxV2L1kFHaehNYAQFnoECBOQAQ&url=https%3A%2F%2Fdocs.genesys.com%2FDocumentation%2FIW% 2Flatest%2F Help%2FChat_Interaction&usg=AOvVaw30OVr8OjNeFzeAXYYDXBy2&opi=89978449 (Year: 2021).*

(Continued)

*Primary Examiner* — James A Reagan
(74) *Attorney, Agent, or Firm* — Sterne, Kessler, Goldstein & Fox P.L.L.C.

(57) ABSTRACT

System, method, and various embodiments for conversation resource deallocation system are described herein. An embodiment operates by initiating a conversation between a chat bot and a user device, allocating a plurality of resources to maintain the conversation, and generating both a state entry and master entry for the conversation in a storage system, whereby the state entry is associated with a timeout period for the conversation. A first list of all master entries and a second list of master entries for which a corresponding one of the state entry is retrieved. A third list of the master entries for which the timeout period has expired is generated based on the first and second lists. Based on the third list, it is determine that the conversation has exceeded the timeout period, and the resources are deallocated.

20 Claims, 3 Drawing Sheets

(56) References Cited

U.S. PATENT DOCUMENTS

| | | | | |
|---|---|---|---|---|
| 2014/0006968 | A1* | 1/2014 | Fox | G06Q 10/107<br>715/752 |
| 2018/0367484 | A1* | 12/2018 | Rodriguez | H04L 67/75 |
| 2018/0375947 | A1* | 12/2018 | Hodges | H04W 4/21 |
| 2019/0052584 | A1* | 2/2019 | Barve | G06Q 10/04 |
| 2020/0004813 | A1* | 1/2020 | Galitsky | G06F 40/30 |
| 2020/0099633 | A1* | 3/2020 | D'Agostino | G06F 3/0481 |
| 2020/0169554 | A1* | 5/2020 | Trim | H04W 4/12 |
| 2020/0175430 | A1* | 6/2020 | Kochura | H04L 51/02 |
| 2020/0344187 | A1* | 10/2020 | D'Agostino | H04L 51/02 |
| 2021/0184995 | A1* | 6/2021 | Jones | G06F 40/58 |
| 2022/0101833 | A1* | 3/2022 | Ross | G10L 15/1822 |
| 2022/0101839 | A1* | 3/2022 | George | G06N 5/02 |
| 2023/0108637 | A1* | 4/2023 | Rabinovich | G06F 18/22<br>717/124 |
| 2023/0208784 | A1* | 6/2023 | Kumar | G06F 9/451<br>709/206 |
| 2023/0208971 | A1* | 6/2023 | Te Booij | G06Q 30/01 |
| 2023/0326451 | A1* | 10/2023 | Sundararajan | G10L 15/285<br>704/270 |
| 2023/0421519 | A1* | 12/2023 | Savin | H04L 51/216 |
| 2024/0281410 | A1* | 8/2024 | Williams | G06F 16/122 |
| 2025/0259711 | A1* | 8/2025 | Crabtree | G16B 50/00 |

OTHER PUBLICATIONS

"Managing session timeouts." (Oct. 31, 2023). Retrieved online Feb. 27, 2026. (Year: 2023) https://www.google.com/url?sa=t&rct=j&q=&esrc=s&source=web&cd=&ved=2ahUKEwjMofvMqfqSAxWXF1kFHY5GKaMQFnoECB4QAQ&url=https%3A%2F%2Fdocs.pega.com%2Fbundle%2Fplatform%2Fpage%2Fplatform%2Fuser-experience%2Fmanaging-session-timeouts.html&usg=AOvVaw16lpDaydcb2mBuNuUhxMcD&opi=89978449 (Year: 2023).*

Jacob Firuta. "Understanding Chat assignment." (Sep. 12, 2023). Retrieved online Feb. 27, 2026. Understanding chat assignment | LiveChat Help Center | LiveChat.com (Year: 2023).*

* cited by examiner

CONVERSATION RESOURCE DEALLOCATION SYSTEM

BACKGROUND

A conversation may include a back-and-forth interaction between two different parties, such as a user and a chatbot. Each conversation that is occurring consumes some amount of allocated computing resources to maintain the conversation and allow the back-and-forth communications. However, maintaining conversations that are no longer active can unnecessarily reduce system throughput by consuming computing resources that could otherwise be allocated to other conversations or computing processes.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a conversation resource deallocation system.

A conversation may include a back-and-forth interaction between two different parties, such as a user and a chatbot. Each conversation that is occurring consumes some amount of allocated computing resources to maintain the conversation and allow the back-and-forth communications. However, maintaining conversations that are no longer active can unnecessarily reduce system throughput by consuming computing resources that could otherwise be allocated to other conversations or computing processes.

Figure 1:
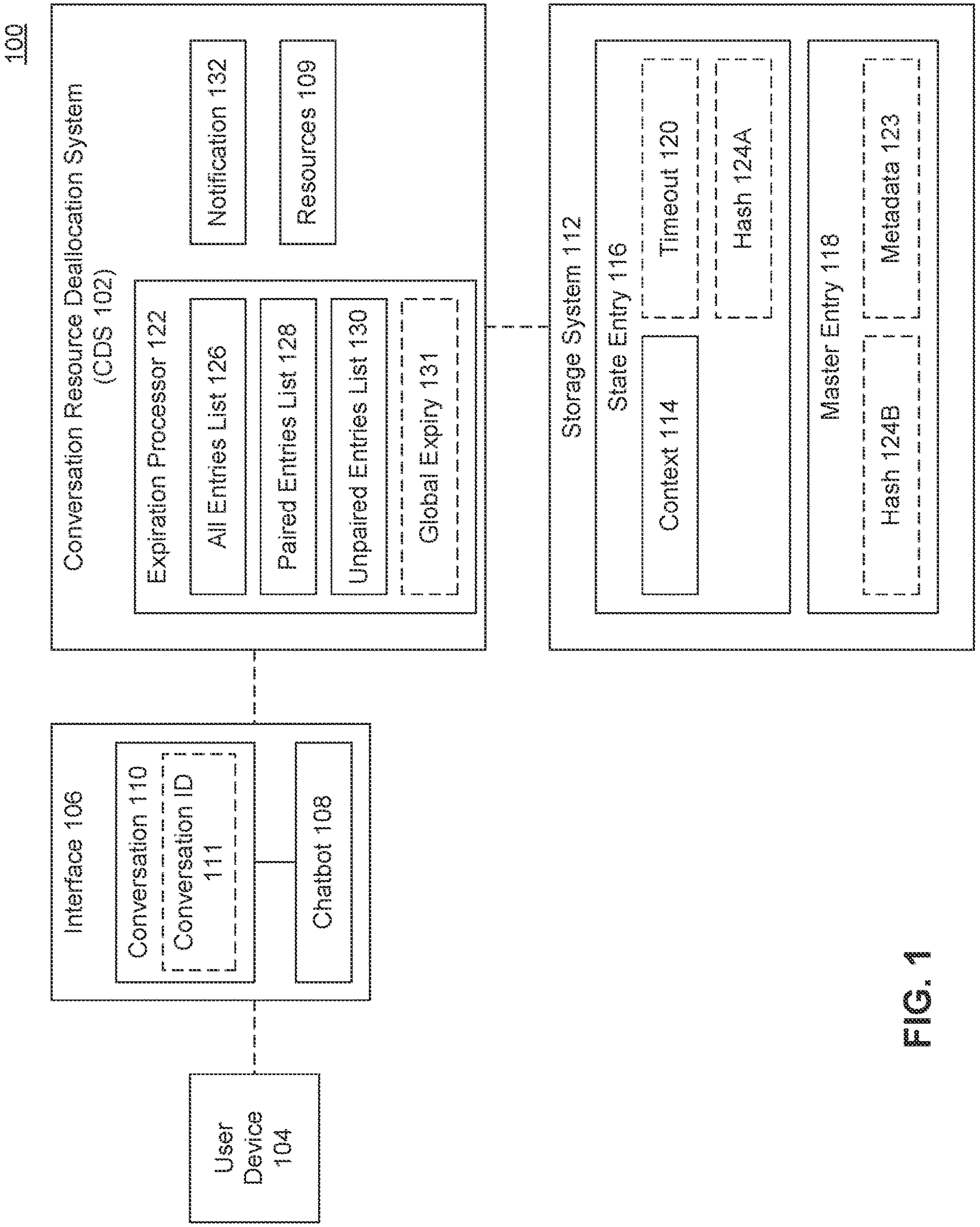
FIG. 1 is a block diagram illustrating example functionality for a conversation resource deallocation system (CDS), according to some embodiments.

FIG. 1 is a block diagram 100 illustrating example functionality for a conversation resource deallocation system (CDS) 102, according to some embodiments. CDS 102 may control the allocation and deallocation of resources in a system, particularly a conversational context or with a chatbot system. For example, CDS 102 may monitor the activity in a conversation between a user device and a chatbot, and according to some predefined guidelines, such as a timeout period, may cause a computing system to deallocate resources from the conversation when it is determined that some threshold of the guidelines has been exceeded or violated. Those deallocated resources may then be utilized in other computing processes, including supporting other conversations between other users and one or more chatbots.

In some embodiments, a user device 104 may load or connect to an interface 106 that allows the user device 104 to access a chatbot application 108. User device 104 may include any computing device such as a mobile phone, laptop, tablet, SMART television, or other internet of things (IoT) device that enables communications with chatbot 108. Those communications may include visual and/or auditory responses to queries and the sending of files or other data back and forth.

In some embodiments, chatbot 108 may its own standalone app or interface 106, in other embodiments, the chatbot 108 may be integrated into interface 106 such as an app or a website as functionality accessible to a user via user device 104. In some embodiments, chatbot 108 may be a software application that allows a user to use natural language through text or voice, and tries to mimic human conversations. In some embodiments, chatbot 108 may be connected to or utilize an artificial intelligence or machine learning system, and/or one or more data repositories it may access to answer user queries or respond to user entries.

In some embodiments, CDS 102 may receive a request from user device 104 to initiate a conversation 110 with chatbot 108. CDS 102 may then allocate or otherwise cause another computing system to allocate or make available some set of computing resources 109 and bandwidth for interactions between chatbot 108 and user device 104. Examples of these computing resources 109 may include allocating a port, allocating memory, managing the open conversations and/or the storage of the log of conversations 110 in a storage system 112. Though shown as part of CDS 102, in some embodiments, resources 109 may be distributed across one or more other computing devices, networked together in a cloud or communications environment.

Conversation 110 may include an interactions between input received from user device 104 directed to chatbot 108 and input from chatbot 108 directed to user device 104. These communications may include audible and/or textual communications. In some embodiments, CDS 102 or one or more computing devices may maintain a log of the data transmitted between user device 104 and chatbot 108 as part of conversation 110.

Storage system 112 may be a system of data storage that is used to store a log or context 114 of a conversation 110. In some embodiments, storage system 112 may be a REDIS (remote dictionary server) system. REDIS is one example of an in-memory storage system that stores and accesses data using key-values. The in-memory access of storage system 112 allows for faster storage and retrieval (relative to disk based, conventional database storage), which may be beneficial for real-time conversations 110 between a user device 104 and chatbot 108. For this reason, a disk-based storage, such as a traditional database may be not be suitable or may provide suboptimal performance if used with conversations 110.

However, one of the challenges with an in-memory system, such as REDIS, is that there may not be any real-time notification of the expiry of a data object stored in the storage system 112. Instead, the storage system 112 may be configured to simply delete expired entries without providing any prior notification of their expiration or deletion.

For example, if a data object storing the context 114 of a conversation 110 expires, there may no notification from storage system 112 to inform a computing system that allocated resources 109 that the conversation 110 or data object including context 114 has expired. This may cause a computing system to unnecessarily continue to allocate resources 109 (or keep resources 109 allocated) to a conversation 110 that has already expired. This is an unnecessary consumption of resources 109 that increases system overhead and reduces system throughput. CDS 102 addresses this issue by enhancing the functionality of storage system 112 and implementing a resource allocation/deallocation check and functionality as described herein.

In some embodiments, when a conversation 110 is initiated, CDS 102 may generate a conversation identifier (ID) 111, identifying the conversation 110. The conversation ID 111 may be any value or set of values, such as alphanumeric characters, that is used to uniquely identify the conversation between user device 104 and chatbot 108. Each conversation 110 may include its own unique conversation ID 111. In some embodiments, CDS 102 may associate or track which resources 109 have been allocated to which conversation ID 111.

CDS 102 may also generate or command storage system 112 to generate both a state entry 116 and a master entry 118 for the conversation 110, when a conversation 110 is requested or initiated. State entry 116 may include a data object stored in the in-memory storage system 112 that stores or is configured to store context 114 of a conversation 110. State entry 116 may include or be assigned a timeout period 120, after which the state entry 116 is deleted by storage system 112. In some embodiments, each conversation 110 may include its own unique state entry 116 and context 114. It is to be understood that the system of FIG. 1 may support multiple simultaneous conversations 110, each with a corresponding state entry 116 and master/or entry 118 as described herein, however for simplicity, only a single conversation 110, state entry 116, and master entry 118 are illustrated in FIG. 1.

As just noted, state entry 116 may be assigned a timeout period 120. Timeout 120 may include any parameters that indicate when a conversation 110 is to expire or otherwise be terminated. For example, timeout 120 may include a maximum length of idle time after which the conversation 110 can or should be maintained before it is deemed inactive. Idle time may include the length of time since the most recent input from user device 104 and/or chatbot 108 via the conversation 110.

For example, timeout 120 may be 15 minutes. As such, if 15 minutes has passed since the most recent input from user device 104 or output from chatbot 108, the timeout 120 may be exceeded. If, however, after 14 minutes, a new entry or request is received from user device 104, the timeout period 120 may be reset.

In some embodiments, the timeout 120 may include a maximum session time for a conversation. For example, timeout 120 may be 60 minutes. Thus, from the initiation of conversation 110 or the first interaction by chatbot 108 or user device 104, the conversation 110 may be maintained for 60 minutes regardless of the number of or frequency of interactions. In some embodiments, state entry 116 may include multiple timeouts 120. For example, the state entry 116 may include a first timeout 120 on the first of the maximum idle time and a second timeout 120 on the maximum session time being exceeded. The first timeout 120 to be reached/exceeded may cause the state entry 116 to be deleted from storage system 112. In some embodiments, timeout 120 may include a maximum number of queries or inputs that are received from user device 104 (e.g., such as a maximum of 20 entries or queries).

As referenced above, one of the challenges with storage system 112, is that it may not support or include any built-in real-time notifications upon expiration of the timeout period 120. Instead, when timeout 120 is exceeded, storage system 112 may automatically remove the state entry 116 from the memory or storage system 112 without providing any notification as such. However, this can become problematic because without a notification, the resources 109 allocated to conversation 110 may remain allocated even beyond the timeout period 120.

To address this notification issue and prevent resources 109 from being unduly allocated to expired conversations 110, CDS 102 may also generate or cause storage system 112 to generate a master entry 118 corresponding to the state entry 118, which may be used, at least in part to address the issue described above. Unlike state entry 116, master entry 118 may not include a timeout period, or may include a timeout period that is larger than any possible timeout 120 for state entry 116.

An expiration processor 122 may then periodically check to see whether master entry 118 includes a corresponding state entry 116 in storage system 112. If master entry 118 includes a timeout period (not illustrated), the timeout period should be sufficiently larger than the maximum timeout 120 for the corresponding state entry 116 and account for how often the expiration processor 122 executes. For example, if state entry 116 includes a maximum timeout of 60 minutes, and expiration processor 122 executes every 1 minute, then the timeout period of master entry 118 would be greater 61 minutes to account for both the maximum expiration of state entry 116 and a subsequent periodic execution of expiration processor 122. One advantage of this timeout period for master entry 118 is that it may prevent master entries 118 from being maintained for longer than necessary. However, for simplicity, the examples herein focus on an embodiment that master entry 118 does not include a timeout period.

In some embodiments, expiration processor 122 may include a global expiry 131 (e.g., similar to timeout 120) that applies to all entries state entry 116 and master entry 118. The global expiry 131 may be a timeout value that indicates that any entry that exceeds the global expiry 131 is to be removed and the corresponding resources 109 deallocated. For example, the global expiry 131 may be 24 hours, such that any entries (state entries 116 or master entries 118 more than 24 hours old may be removed by expiration processor 122 and the corresponding resources 109 deallocated).

In some embodiments, master entry 118 may include metadata 123. Metadata 123 may include any data associated with state entry 116 or conversation 110 that is stored and may be used for processing. In some embodiments, metadata 123 may indicate when conversation 110 was initiated, a conversation start time—which may be used with by the expiration processor 122 in checking whether the global expiry 131 has been reached or exceeded. In some embodiments, state entry 116 and/or master entry 118 may also store the conversation ID 111.

In some embodiments, to coordinate or determine which master entry 118 corresponds to which state entry 116, CDS 102 may generate a bash value 124 (which is a term that may be used generally to refer to hash value 124A and hash value 124B as illustrated). Hash value 124 may include a unique identifier that is generated, by CDS 102 or storage system 112, for each conversation 110. In some embodiments, the hash value 124 may generated, at least in part, on the conversation ID 111 for the conversation 110.

The hash value 124 may be stored with both state entry 116 and master entry 118, as hash value 124A and hash value 124B respectively. This hash value may be used to pair a state entry 116 with a master entry 118 to identify which conversation(s) 110 may have expired and for which the resources 109 can now be deallocated. In some embodiments, the conversation ID 111 as stored by both the state entry 116 and master entry 118 may be used in addition to, or in lieu of the hash value 124 as described herein.

Expiration processor 122 may be a system, processor, or device configured to identify when a timeout 120 has been exceeded, and consequently determine when a conversation 110 has expired and resources 109 can be deallocated or reallocated. In some embodiments, expiration processor 122 may run continuously, or periodically. In some embodiments, expiration processor 122 may generate an all entries list 126. All entries list 126 may include a list of all the master entries 118 stored in storage system 112. In some embodiments, the all entries list 126 may include a list of the hash values 124B of the corresponding master entries 118.

In some embodiments, expiration processor 122 may also generate a paired entries list 128. The paired entries list 128 may include all those entries for which both a master entry 118 and a corresponding state entry 116 (as determined by matching hash values 124B and 124A) were identified in storage system 112. In some embodiments, the paired entries list 128 may include a list of all the hash values 124A of all the existing state entries 116 (e.g., without performing any matching operation or functionality). In some embodiments, both the all entries list 126 and paired entries list 128 may be generated by issuing queries to storage system 112. In some embodiments, the state entries 116 may be stored in a first table, array, device, page, or other storage structure, and the master entries 118 may be stored in a second table, array, device, page, or other storage structure in or by storage system 112.

In some embodiments, expiration processor 122 may generate an unpaired entries list 130. In some embodiments, the unpaired entries list 130 may be generated directly by CDS 102 without querying the storage system 112 (which may save bandwidth and computing resources). Instead, CDS 102 may generate the unpaired entries list 130 based on comparing the all entries list 126 and the paired entries list 128.

For example, CDS 102 may remove the values of the paired entries list 128 from the values of the all entries list 126, which would result in the unpaired entries list 130. The unpaired entries list 130 may indicate or include all those hash values 124 for master entries 118 without a corresponding state entry 116 (e.g., which may have been deleted because the timeout period 120 for the state entry 116 has expired). CDS 102 may conclude that any conversation 110 corresponding to an entry on the unpaired entry list 130 is expired.

In some embodiments, once the list of existing master entries 118 without corresponding state entries 116 has been generated, CDS 102 may cause the conversation 110 to be terminated, the resources 109 deallocated or reallocated to another computing process, and the master entry 118 may be removed from storage system 112.

In some embodiments, CDS 102 may generate a notification 132 indicating that the conversation 110 has bene terminated. The notification 132 may include any visual and/or auditory notification or message to user device 104, such as greying out the conversation box on interface 106, providing a pop-up message indicating the conversation has expired, and/or providing a beep sound.

In some embodiments, the notification 132 may include a user selectable option to begin a new conversation 110. For example, notification 132 may include a button that when selected by the user via the user device 104, initiates a new conversation 110 on the same interface 106 between user device 104 and chatbot 108. This new conversation 110 selection may cause CDS 102 to generate a new state entry 116, new master entry 118, and allocate a new set of resources 109 for this new conversation.

Figure 2:
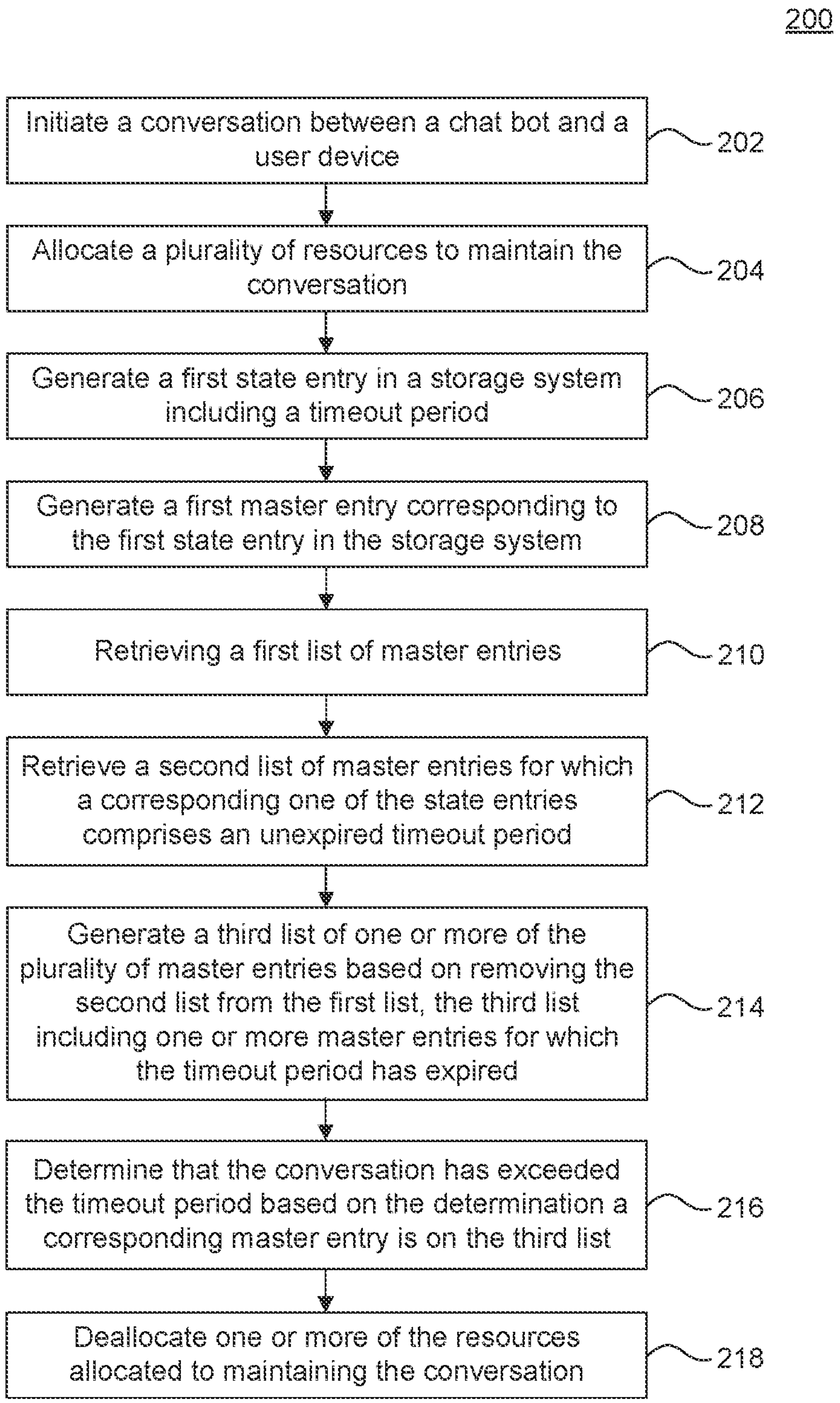
FIG. 2 is a flowchart illustrating example operations for providing a conversation resource deallocation system (CDS), according to some embodiments.

FIG. 2 is a flowchart 200 illustrating example operations for providing a conversation resource deallocation system (CDS) 102, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1.

In 202, a conversation between a chat bot and a user device is initiated. For example, a user, via user device 104, may select an option from user interface 106, such as requesting help or for an order lookup, that initiates conversation 110.

In 204, a plurality of resources is allocated to maintain the conversation. For example, CDS 102 may cause a set amount of computing resources 109 to be allocated to initiate and maintain conversation 110. In some embodiments, the computing resources 109 may be distributed across multiple computing devices. In some embodiments, the computing resources 109 may be allocated one or more computing devices communicatively coupled to CDS 102, and may allocate the resources without or prior to instruction from CDS 102.

In 206, a first state entry is generated in a storage system including a timeout period. For example, state entry 116, including timeout period 120, may be generated in storage system 112. Storage system 112 may include a REDIS system, or other in-memory storage system that allows for rapid information storage and retrieval. State entry 116 may be used to store context 114 or content from conversation 110.

In 208, a first master entry corresponding to the first state entry is generated in the storage system. For example, CDS 102 may request that master entry 118 is generated in storage system 112. In some embodiments, state entry 116 and master entry 118 may share a hash value 124. In some embodiments, state entry 116 may be generated prior to master entry 118 which may prevent any issues that would arise if expiration processor 122 executed between the time master entry 118 was generated and state entry 116 was generated if master entry 118 was generated prior to state entry 116.

In 210, a first list of master entries is retrieved. For example, expiration processor 122 may retrieve the all entries list 126, which may include a complete list of master entries 118 stored in storage system 112. The all entries list 126 may include any identifiers, including but not limited to hash values 124B.

In 212, a second list of master entries for which a corresponding one of the state entries comprises an unexpired timeout period is retrieved. For example, expiration processor 122 may retrieve the paired entries list 128 which may include a list of the state entries 116, or a list of the master entries 118 for which corresponding state entries 116 were identified based on hash values 124B and 124A.

In 214, a third list of one or more of the plurality of master entries is generated based on removing the second list from the first list, the third list including one or more master entries for which the timeout period has expired. For example, expiration processor 122 may generate the unpaired entries list 130 may removing the paired entries list 128 from the all entries list 126.

In 216, it is determined that the conversation has exceeded the timeout period based on the determination a corresponding master entry is on the third list. For example, expiration processor 122 may determine that conversation 110 has expired based on its corresponding master entry 118 (e.g., associated with hash value 124B) being identified on the unpaired entries list 130 (for which there is no corresponding state entry 116 with corresponding hash value 124A in storage system 112).

In 218, one or more of the resources allocated to maintaining the conversation are deallocated. For example, CDS 102 may issue a notification 132 indicating that the conversation 110 has ended, deallocate any computing resources and bandwidth associated with maintaining the conversation 110 and remove master entry 118 from storage system 112. In some embodiments, CDS 102 may wait for a user selection of a confirmation expiration notification 132 provided via interface 106 prior to deallocating the resources 109.

Figure 3:
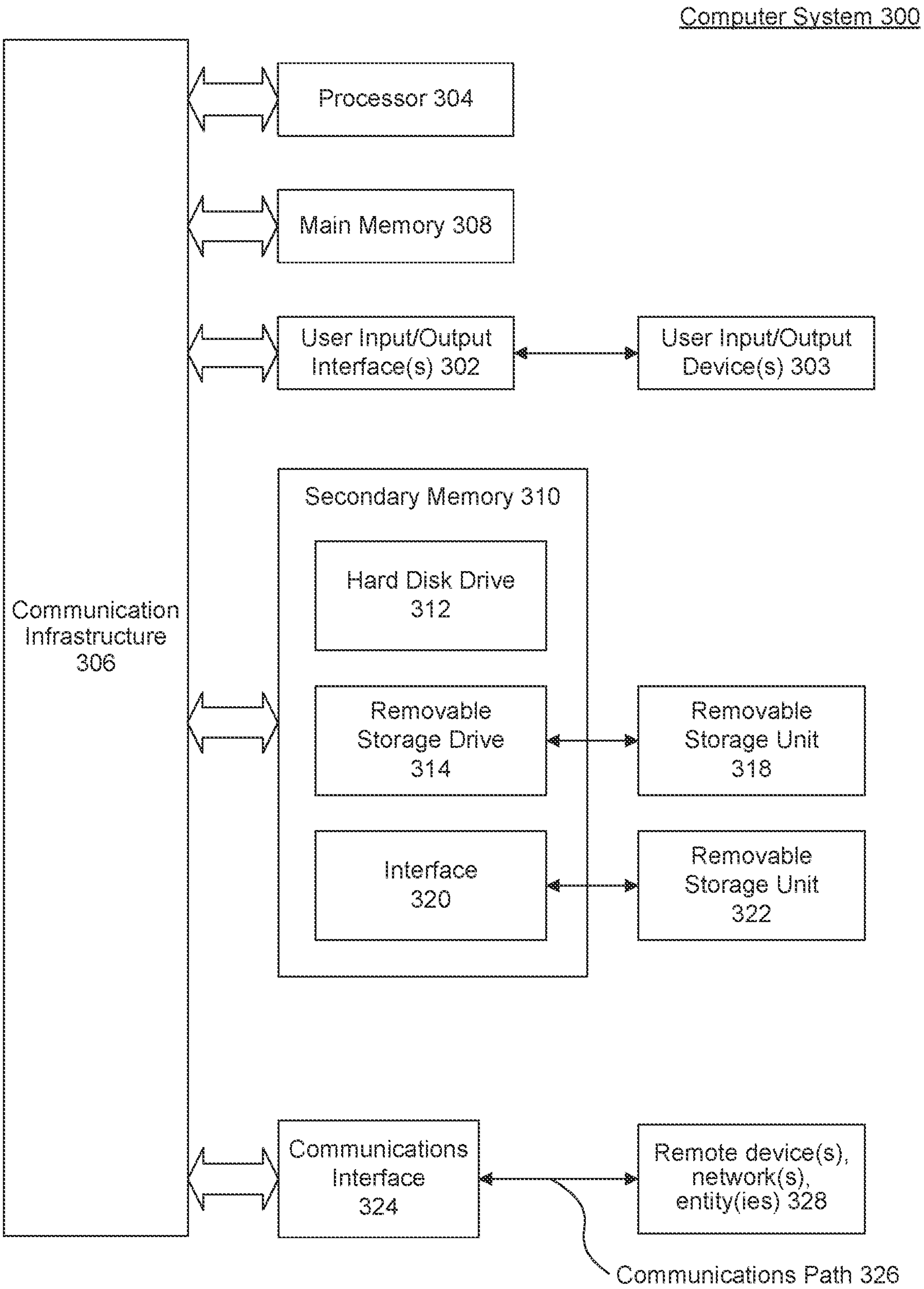
FIG. 3 is example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions, local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc using orderings different than those described herein.

References herein to "one embodiment." "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:

initiating a conversation between a chat bot and a user device, wherein the initiating comprises:

allocating a plurality of resources to maintain the conversation, generating a first state entry in a storage system, the first state entry being configured to store interactions between the user device and the chat bot, wherein the first state entry comprises a timeout period, and generating a first master entry in the storage system, the first master entry corresponding to the first state entry and storing metadata associated with the first state entry, wherein the storage system stores a plurality of state entries including the first state entry and a plurality of master entries including the first master entry;

retrieving a first list of the plurality of master entries;

retrieving a second list of the plurality of master entries for which a corresponding one of the plurality of state entries comprises an unexpired timeout period;

generating a third list of one or more of the plurality of master entries based on removing the second list from the first list, wherein the third list comprises the one or more of the plurality of master entries for which the timeout period has expired;

determining that the first master entry is on the third list;

determining that the conversation has exceeded the timeout period based on the determination that the first master entry is on the third list; and deallocating one or more of the resources allocated to maintaining the conversation based on the determination that the conversation has exceeded the timeout period.

2. The method of claim 1, wherein the timeout period corresponds to a maximum idle period during which no entry is received by the chat bot from the user device.

3. The method of claim 1, wherein the timeout period corresponds to a maximum length of time for the conversation between the chat bot and the user device.

4. The method of claim 1, wherein the initiating further comprises:

generating a hash value for the conversation; and associating the hash value with both the first state entry and the first master entry.

5. The method of claim 1, wherein the deallocating comprises:

providing a notification to the user device indicating that the conversation has expired.

6. The method of claim 5, wherein the notification includes an option to begin a new conversation.

7. The method of claim 1, wherein the storage system comprises a REDIS (remote dictionary server) storage system.

8. A system comprising:

a memory; and at least one processor coupled to the memory and configured to perform operations comprising:

initiating a conversation between a chat bot and a user device, wherein the initiating comprises:

allocating a plurality of resources to maintain the conversation, generating a first state entry in a storage system, the first state entry being configured to store interactions between the user device and the chat bot, wherein the first state entry comprises a timeout period, and generating a first master entry in the storage system, the first master entry corresponding to the first state entry and storing metadata associated with the first state entry, wherein the storage system stores a plurality of state entries including the first state entry and a plurality of master entries including the first master entry;

retrieving a first list of the plurality of master entries;

retrieving a second list of the plurality of master entries for which a corresponding one of the plurality of state entries comprises an unexpired timeout period;

generating a third list of one or more of the plurality of master entries based on removing the second list from the first list, wherein the third list comprises the one or more of the plurality of master entries for which the timeout period has expired;

determining that the first master entry is on the third list;

determining that the conversation has exceeded the timeout period based on the determination that the first master entry is on the third list; and deallocating one or more of the resources allocated to maintaining the conversation based on the determination that the conversation has exceeded the timeout period.

9. The system of claim 8, wherein the timeout period corresponds to a maximum idle period during which no entry is received by the chat bot from the user device.

10. The system of claim 8, wherein the timeout period corresponds to a maximum length of time for the conversation between the chat bot and the user device.

11. The system of claim 8, wherein the initiating further comprises:

generating a hash value for the conversation; and associating the hash value with both the first state entry and the first master entry.

12. The system of claim 8, wherein the deallocating comprises:

providing a notification to the user device indicating that the conversation has expired.

13. The system of claim 12, wherein the notification includes an option to begin a new conversation.

14. The system of claim 8, wherein the storage system comprises a REDIS (remote dictionary server) storage system.

15. A non-transitory computer-readable medium having instructions stored thereon that, when executed by at least one computing device, cause the at least one computing device to perform operations comprising:

initiating a conversation between a chat bot and a user device, wherein the initiating comprises:

allocating a plurality of resources to maintain the conversation, generating a first state entry in a storage system, the first state entry being configured to store interactions between the user device and the chat bot, wherein the first state entry comprises a timeout period, and generating a first master entry in the storage system, the first master entry corresponding to the first state entry and storing metadata associated with the first state entry, wherein the storage system stores a plurality of state entries including the first state entry and a plurality of master entries including the first master entry;

retrieving a first list of the plurality of master entries;

retrieving a second list of the plurality of master entries for which a corresponding one of the plurality of state entries comprises an unexpired timeout period;

generating a third list of one or more of the plurality of master entries based on removing the second list from the first list, wherein the third list comprises the one or more of the plurality of master entries for which the timeout period has expired;

determining that the first master entry is on the third list;

determining that the conversation has exceeded the timeout period based on the determination that the first master entry is on the third list; and deallocating one or more of the resources allocated to maintaining the conversation based on the determination that the conversation has exceeded the timeout period.

16. The non-transitory computer-readable medium of claim 15, wherein the timeout period corresponds to a maximum idle period during which no entry is received by the chat bot from the user device.

17. The non-transitory computer-readable medium of claim 15, wherein the timeout period corresponds to a maximum length of time for the conversation between the chat bot and the user device.

18. The non-transitory computer-readable medium of claim 15, wherein the initiating further comprises:

generating a hash value for the conversation; and associating the hash value with both the first state entry and the first master entry.

19. The non-transitory computer-readable medium of claim 15, wherein the deallocating comprises:

providing a notification to the user device indicating that the conversation has expired.

20. The non-transitory computer-readable medium of claim 19, wherein the notification includes an option to begin a new conversation.

* * * * *